US 6,598,718 B2

(12) United States Patent
Kato et al.

(10) Patent No.: US 6,598,718 B2
(45) Date of Patent: Jul. 29, 2003

(54) VIBRATION DAMPING DEVICE HAVING A FLOCK COATING

(75) Inventors: Rentaro Kato, Kasugai (JP); Koichi Maeda, Komaki (JP)

(73) Assignee: Tokai Rubber Industries, Ltd., Komaki (JP)

(*) Notice: Subject to any disclaimer, the term of this patent is extended or adjusted under 35 U.S.C. 154(b) by 0 days.

(21) Appl. No.: 10/102,050

(22) Filed: Mar. 19, 2002

(65) Prior Publication Data

US 2002/0139625 A1 Oct. 3, 2002

(30) Foreign Application Priority Data

Mar. 30, 2001 (JP) ........................................ 2001-099764

(51) Int. Cl.[7] .................................................. F16F 7/10
(52) U.S. Cl. ...................................................... 188/378
(58) Field of Search ............................... 188/378, 379, 188/380; 267/136, 141, 153

(56) References Cited

U.S. PATENT DOCUMENTS

| | | |
|---|---|---|
| 2,714,161 A | 7/1955 | Featherstun |
| 3,612,222 A | 10/1971 | Minor |
| 4,753,841 A * | 6/1988 | Noel et al. .................. 428/174 |
| 5,115,104 A * | 5/1992 | Bunyan .................. 174/35 GC |
| 6,125,977 A * | 10/2000 | Nekomoto et al. ......... 188/378 |
| 6,494,444 B2 * | 12/2002 | Hasegawa .................. 267/141 |
| 6,536,566 B2 * | 3/2003 | Hasegawa et al. .......... 188/378 |

FOREIGN PATENT DOCUMENTS

| | | |
|---|---|---|
| JP | B2-125878 | 8/1938 |
| JP | 57-52305 | 3/1982 |
| JP | 64-42591 | 3/1989 |
| JP | 3-86227 | 8/1991 |
| JP | 4-46246 | 4/1992 |
| JP | 9-329182 | 12/1997 |
| WO | WO 00/14429 | 3/2000 |

* cited by examiner

Primary Examiner—Matthew C. Graham
(74) Attorney, Agent, or Firm—Beyer Weaver & Thomas, LLP

(57) ABSTRACT

Disclosed is a vibration-damping device comprising an abutting member adapted to be fixedly disposed in a vibrative member and an independent mass member disposed relative to the abutting member such that the independent mass member is displaceable relative to the abutting member while being independent of the abutting member without being adhesive to the abutting member. The independent mass member having an abutting surface that comes into abutting contact directly and elastically with an abutting surface of the abutting member, in which at least one of the abutting surfaces of the abutting member and the independent mass member is provided with a flock coating.

14 Claims, 8 Drawing Sheets

VIBRATION DAMPING DEVICE HAVING A FLOCK COATING

INCORPORATED BY REFERENCE

The disclosure of Japanese Patent Application No. 2001-099764 filed on Mar. 30, 2001 including the specification, drawings and abstract is incorporated herein by reference in its entirety.

BACKGROUND OF THE INVENTION

1. Field of the Invention

The present invention relates generally to a vibration damping device installed in a various kinds of vibrative members in order to reduce vibrations excited in these vibrative members, and more particularly to such a vibration damping device that is novel in construction and that is suitably applicable as a vibration damping device for use on an automotive vehicle for damping vibrations excited in suspension arms, sub flames, body panels, mounting brackets, and vibrative members used in an engine unit and an exhaustion system.

2. Description of the Related Art

As examples of vibration damping means for damping or reducing vibration excited in various kinds of vibrative members, there are known (a) a mass damper in which a mass member is fixed to a vibrative member, (b) a dynamic damper in which a mass member is supported by and connected to the vibrative member via a spring member and (c) a damping material that is a sheet-shaped elastic member and secured to the vibrative member. However, these conventional devices suffer from various potential problems. For example, (a) the mass damper and (b) the dynamic damper both require a relatively large mass of the mass member, and exhibit a vibration damping effect only to a limited frequency range. (c) The damping material suffers from difficulty in stably exhibiting a desired damping effect, since the damping effect of the damping material is prone to vary depending upon the ambient temperature.

The present assignee has been disclosed in International Publication WO 00/14429 a novel vibration damper for use on an automotive vehicle, which includes a housing member fixed to the vibrative member, and an independent mass member that is housed in the housing member with a spacing therebetween, without being bonded to the housing member, so that the independent mass member is displaceable or movable relative to the housing member, while being independent of the housing member. In the disclosed vibration damper, the independent mass member comes into impact on or abutting contact with the housing member with elastic abutting surfaces, upon application of a vibrational load to the damper, whereby the vibration excited in the vibrative member is effectively reduced or absorbed. The proposed vibration damper is capable of exhibiting a high damping effect over a sufficiently wide frequency range of frequency of input vibrations, while having a relatively small weight in comparison with the conventional mass damper and dynamic damper.

SUMMARY OF THE INVENTION

The present invention has been developed by an extensive study of a vibration damper for use on an automotive vehicle disclosed in the above-indicated International Publication WO 00/14429. It is therefore an object of this invention to provide an improved vibration damping device capable of exhibiting a further improved vibration damping effect, in comparison with the vibration damper disclosed in the International Publication WO 00/14429.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A vibration-damping device for damping vibrations of a vibrative member, comprising: (a) an abutting member adapted to be fixedly disposed in the vibrative member and having an abutting surface; and (b) an independent mass member disposed in relation to the abutting member such that the independent mass member is independently displaceable relative to the abutting member without being adhesive to the abutting member, the independent mass member having an abutting surface that comes into abutting contact directly and elastically with the abutting surface of the abutting member, wherein at least one of the abutting surfaces of the abutting member and the independent mass member is provided with a flock coating.

In the vibration damping device constructed according to this mode of the present invention, a vibrational load applied from the vibrative member to the vibration damping device causes a displacement of the independent mass member relative to the vibrative member. As a result, the independent mass member comes into impact on (abutting contact with) the abutting member, whereby the vibration-damping device can exhibit an excellent vibration damping effect as a result of the impact of the independent mass member on the abutting member.

Further, the independent mass member is displaced relative to the abutting member due to the vibrational load applied to the vibration damping device, and comes into abutting contact with the abutting member at their abutting surfaces at least one of which is provided with the flock coating. This enables the vibration-damping device to exhibit a higher damping characteristic in comparison with the case where the abutting surface is composed of a rubber elastic body or elastomer.

This abutting contact of the independent mass member with the abutting member via the flocked abutting surface or surfaces allows the vibration damping device to exhibit an excellent damping effect on the basis of the impact (abutting contact) of the independent mass member on the abutting member, without needing a significant increase of the mass of the independent mass member, with respect to low frequency vibrations. For this reason, the vibration damping device of this mode of the invention can exhibit a high damping effect with respect to vibrations excited in the vehicle whose frequencies ranging from about 10 Hz to about 100 Hz, for example.

The technical reasons for the above-described significant improve in the damping characteristics of the present vibration damping device owing to the use of the flocked abutting surface has not yet been revealed sufficiently. Although it is not an object of the invention to clarify this technical reason, it might be assumed that the flock coating provided on at least one of the abutting surfaces of the abutting member and the independent mass member allows the abutting and independent mass members to come into abutting contact with each other, while remarkably exhibiting a non-linear raise or increase of the spring constant generated between the abutting surfaces of the abutting member and the independent mass member.

A further extensive study of the present vibration damping device conducted by the present inventors reveals that the vibration damping device constructed according to this mode (1) of the invention permits that when the vibration damping device subjected to the vibration excited in the vibrative member, the independent mass member comes into impact on or abutting contact with the abutting member, while permitting the independent mass member to exhibit an amplitude magnification of not smaller than one with respect to the abutting member. This arrangement allows the independent mass member to impact on and rebound from the abutting member repeatedly in an easier manner, resulting in a bouncing displacement of the independent mass member relative to the abutting member with high efficiency. Therefore, the present vibration-damping device is able to provide the bouncing displacement of the independent mass member relative to the abutting member, if an acceleration of the vibration excited in the vibrative member is not greater than 1G (gravitational acceleration). For this reason, the vibration-damping device of this mode of the invention is capable of exhibiting an excellent vibration damping effect with respect to vibrations having a relatively small energy such as vibrations excited in the automotive vehicle, on the basis of the impact or abutting contact of the independent mass member on or with the abutting member. It has also been revealed that since the presence of the flock coating provided on the abutting surface or surfaces assures the non-leaner raise of the spring constant generated between the abutting surfaces of the abutting member and the independent mass member upon abutting contact of these members, the present vibration damping device does not need the independent mass member to completely rebound from or move away from the abutting member, for exhibiting a sufficiently high damping effect that is same as a damping effect obtained when the independent mass member completely rebound from the abutting member.

(2) A vibration-damping device according to the above-indicated mode (1) of the invention, wherein the abutting member comprises a hollow housing member adapted to be fixedly disposed in the vibrative member and including a storage space in which the independent mass member is housed. In this mode of the invention, the abutting member is formed by the hollow housing member, making it possible to stably install the present vibration-damping device in the vibrative member, regardless of the configurations or other factors of the vibrative member.

The housing member may be integrally formed with the vibrative member by effectively utilizing a vibrative member to partially or entirely form the housing member, or alternatively, the housing member may be formed independently of the vibrative member, and then is integrally fixed to the vibrative member by welding, bolts or other fastening means. The number of independent mass member housed in the housing member is desirably determined taking into account the size or shape of the storage space of the housing member, the size of the vibrative member, the level of the vibration excited in the vibrative member. The single storage space may house a single or a plurality of the independent mass member or members. Where a plurality of independent mass members are adopted, these plurality of independent mass members may have a uniform configuration or different configurations in both cases where these plurality of independent mass members are housed in a single storage space and where these plurality of independent mass members are a plurality of storage spaces, respectively. The housing member and the storage space may have a variety of configurations and sizes, without any limitation. For instance, the housing member and the storage space may be selected from a spherical shape, a circular shape in cross section, a rectangular shape in cross section, a polygonal shape in cross section, or the like, while taking into account the configuration of the vibrative member and a space usable for installing the vibration damping device. The configuration of the independent mass member may be suitably desirably selected depending upon the configuration of the storage space, among a variety of configurations including a solid or a hollow spherical shape, a rod shape a plate-like shape.

(3) A vibration-damping device according to the above-indicated mode (1) of the invention, wherein the abutting member comprises a longitudinal rod shaped member adapted to be fixedly disposed in the vibrative member, while the independent mass member comprises an annular or cylindrical member disposed radially outwardly of the rod shaped member. In this mode of the invention, the use of the longitudinal rod shaped member makes it easy to provide the abutting surface of the abutting member to be abutting contact with the independent mass member with simple construction. Further, the independent mass member comes into abutting contact with the abutting member at its inner circumferential surface, permitting the independent mass member to enlarge its outside dimension, in comparison with the case where the independent mass member is housed in the storage space of the housing member and comes into abutting contact with the abutting member at its outer circumferential surface. Therefore, the vibration-damping device of this mode of the invention is effective to obtain a mass of the independent mass member.

The longitudinal rod shaped member may be solid or alternatively be hollow. The traverse cross sectional shape of the rod shaped member is not particularly limited but may be selected from a circular shape, an ellipsoidal shape, a polygonal shape or the like, for example. The longitudinal rod shaped member may be provided with a stopper member that functions to limit an amount of axial displacement of the independent mass member relative to the rod shaped member for thereby preventing a disengagement of the independent mass member from the rod shaped member. This mode of the invention may be effectively adoptable when the vibrative member itself has a longitudinal rod shaped member. In this case, the vibration damping device of the present invention can be made simple in construction, in comparison with the case where the vibration damping device includes a housing member that houses the independent mass member and fixed to the vibrative member.

(4) A vibration-damping device according to any one of the above-indicated modes (1)–(3), wherein the at least one abutting surfaces provided with the flock coating comprises a metallic base. In this mode of the invention, the abutting surface comprises the metallic base provided with the flock coating permits the abutting member and the independent mass member to impact on each other with the non-linear raise of the spring constant generated between abutting surfaces of the abutting member and the independent mass member in a more efficient manner. According to this mode of the invention, the independent mass member and the abutting member may be formed of a metallic base only at their abutting surfaces or alternatively in their entirety. In particular, to form independent mass member out of the metallic base is effective to obtain a sufficiently large mass thereof. The flock coating may be formed on the surface of the metallic base according to know flocking methods. Preferably, the metallic base is initially subjected to a degreasing and conversion treatments. Subsequently, an adhesive layer is applied on the surface of the metallic base by dipping, spraying or the like. Finally, a multiplicity of suitable piles are planted to the outer surface of the metallic base according to a variety of flocking method including an electrostatic flocking.

(5) A vibration-damping device according to any one of the above-indicated modes (1)–(4), wherein the independent mass member has an outer circumferential surface serving as the abutting surface thereof, and having a spherical or cylindrical shape with a circular cross sectional shape, and the flock coating is provided on the outer circumferential surface of the independent mass member. In this arrangement, the abutting surface of the independent mass member is provided with the flock coating and has the spherical or cylindrical shape with the circular cross section, facilitating rotation of the independent mass member. As a result, the independent mass member is likely to change its abutting portion frequently, thereby effectively preventing a local abrasion or deterioration of the flock coating and a resultant change of the vibration characteristics of the vibration-damping device. In addition, since the independent mass member has the spherical or cylindrical shape with the circular cross section, the independent mass member is able to come into abutting contact with the abutting member at its abutting surface whose area is effectively reduced. This arrangement effectively lowers resistance to the displacement of the independent mass member, such as friction upon the abutting contact of the independent mass member with the abutting member, effectively exciting the bouncing displacement of the independent mass member with respect to the abutting member upon application of vibration to the vibration-damping device. Thus, the vibration-damping device of this mode of the invention can exhibit an excellent vibration damping effect on the basis of the impact or abutting contact of the independent mass member on or with the abutting member with a further improved efficiency.

(6) A vibration-damping device according to any one of the above-indicated modes (1)–(5) of the invention, wherein the flock coating provided on the at least one of the abutting surfaces of the abutting member and the independent mass member is formed by using a multiplicity of piles each made of a synthetic resin material and having a thickness of 0.3–3.0 denier and a length of 0.1–3.0 mm. This arrangement makes it possible to ensure a suitable spring characteristic at the abutting portion between the independent mass member and the abutting member for providing a desired vibration damping effect.

(7) A vibration-damping device according to any one of the above-indicated modes (1)–(6) of the invention, wherein the at least one of the abutting surfaces of the abutting member and the independent mass member is provided with the flock coating at one part thereof and with a thin-elastic body layer whose thickness is made smaller than the length of said each pile at an other part thereof. In this mode of the invention, the vibration damping characteristics of the vibration damping device, e.g., a peak of a resonance-like damping effect of the vibration damping device on the basis of the abutting contact of the independent mass member with the abutting member can be tuned by changing an area of the part of the abutting surface to which the flock coating is provided. In addition, the other part of the abutting surface is provided with the thin-elastic body layer, thus almost eliminating a problem of undesirable impact noises generated upon abutting contact of the independent mass member and the abutting member with each other.

(8) A vibration-damping device according to any one of the above-indicated modes (1)–(7), wherein the independent mass member has a mass within a range of 5–500 g in a single form thereof. Namely, if the mass of the independent mass member is set to 500 g or smaller, more preferably 100 g or smaller, the independent mass member can exhibit a relatively low spring characteristic owing to the flock coating, and is less likely to suffer from a problem of fatigue of the flock coating provided on the abutting surface thereof. Moreover, the independent mass member is likely to excite its bouncing displacement upon application of the vibrational load to the vibration-damping device in easier and more efficient manner. If the mass of the independent mass member is set to 10 g or more, more preferably 50 g or more, the vibration-damping device is able to effectively exhibit a desired damping effect on the basis of the abutting contact of the independent mass member with the abutting member in a more effective manner.

(9) A vibration-damping device according to any one of the above-indicated modes (1)–(8), wherein an overall mass of the independent mass member is held within a range of 2–10% of an overall mass of the vibrative member. Namely, if the overall mass of the independent mass member is smaller than 2% of the overall mass of the vibrative member, the vibration-damping device may become insufficient to exhibit an intended damping effect, and if the overall mass of the independent mass member is larger than 10% of the overall mass of the vibrative member, the vibration-damping device may suffer from a problem of increase in the overall weight of the device. In this respect, when the vibration-damping device includes a plurality of independent mass members, the combined mass of the plurality of independent mass members is interpreted to mean the above-indicated overall mass of the independent mass member, so that the combined mass of the plurality of independent mass member is arranged to be held within a range of 2–10% of the overall mass of the vibrative member, preferably.

(10) A vibration-damping device according to any one of the above-indicated modes (1)–(9) of the invention, wherein the abutting member includes two of the abutting surfaces which are opposed to each other in a vibration input direction with the independent mass member interposed therebetween such that the independent mass member is reciprocatory displaceable between the two abutting surfaces by a distance within a range of 0.1–1.6 mm so that the independent mass member comes into abutting contact with the two abutting surfaces of the abutting member located on opposite sides of the independent mass member in the vibration input direction. In this mode of the invention, the distance of the reciprocatory displacement of the independent mass member is set to such a small range, so that the independent mass member is likely to come into abutting contact with the abutting member on the opposite sides thereof in the vibration input direction, even if the input vibration has a relatively small amplitude like vibrations excited in the vehicle. Thus, the vibration-damping device can exhibit an excellent vibration damping effect with respect to vibrations excited in the vehicle.

(11) A vibration-damping device according to any one of the above-indicated modes (1)–(10) of the invention, wherein the abutting member and the independent mass member are formed of a rigid material having a modulus of elasticity of not smaller than 5×10³ MPa, and the at least one of the abutting surfaces is provided with the flock coating. This arrangement enables the vibration-damping device to exhibit a desired vibration damping effect on the basis of the repeated impact (abutting contact) of the independent mass member on (with) the abutting member in a further efficient manner. For instance, the abutting member and the independent mass member may be formed of a hard synthetic resin material having a modulus of elasticity within a range of 5×10³–5×10⁴. This arrangement may be effective to reduce the impact noise generated upon impact of the independent mass member on the abutting member, and to improve vibration-damping effect of the vibration-damping device with respect to vibration in a low frequency band. In order to ensure a high damping effect of the vibration damping device with respect to intermediate and high frequency vibrations, an iron or a rigid material having a modulus of elasticity of not smaller than 5×10⁴ MPa is preferably adopted for a material for forming the abutting member and the independent mass member.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
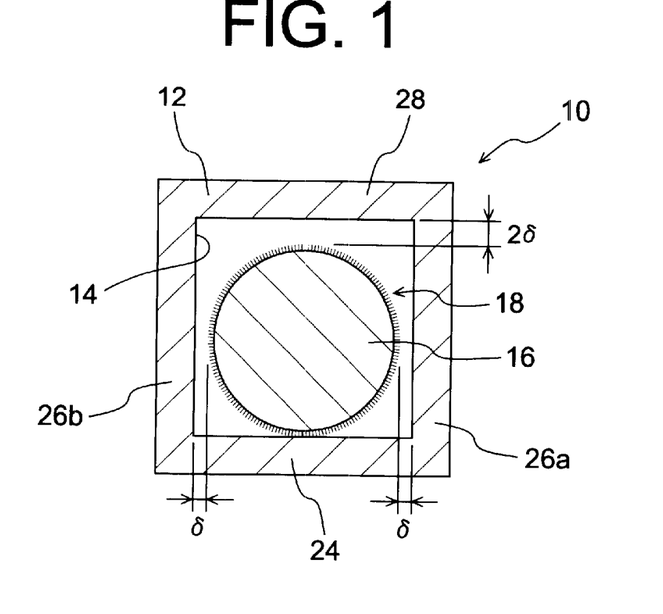
FIG. 1 is an elevational view in vertical cross section of a vibration-damping device constructed according to a first embodiment of the invention.

Referring first to FIG. 1, there is depicted a vibration damping device 10 constructed according to a first embodiment of the present invention. The vibration-damping device 10 includes an abutting member in the form of a housing 12 having a storage space 14 therein, and an independent mass member 16 housed in the storage space 14 of the housing 12. This vibration-damping device 10 is installed in a vibrative member (not shown) like a body of an automotive vehicle with the housing 12 is fixedly disposed in the vibrative member.

Described in detail, the housing 12 is a hollow rectangular box-like member having the storage space 14 formed therein. The storage space 14 has a cubic configuration whose inside dimensions are generally the same in the three mutually perpendicular dimensions. The housing 12 is formed of metallic materials including an aluminum alloy, synthetic resin materials or other rigid materials having a modulus of elasticity of not smaller than 5×10³ MPa.

Figure 2:
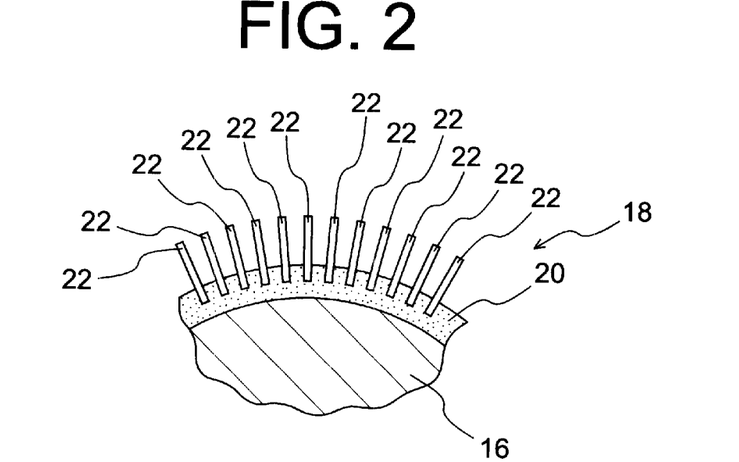
FIG. 2 is a fragmentally enlarged view of an independent mass member of the vibration-damping device of FIG. 1.

The independent mass member 16, as shown in FIG. 2, a solid spherical member formed of high gravity metallic materials such as iron. A flock coating 18 is provided on an entire outer circumferential surface of the independent mass member 16, according to a variety of know flocking methods, e.g., the following flocking method.

Initially, the independent mass member 16 is subjected to a degreasing treatment according to an optional known method, e.g., spraying, dipping, ultrasonic-wave dipping, electrolysis dipping or the like, using a degreasing agent(s) such as alkali phosphate, alkali carbonate, surface-active agents, modifiers, or the like. Subsequently, a known chemical pretreatment is carried on by spraying or dipping using a chemical pretreatment agent(s) including zinc phosphate salt, iron phosphate, chromate, phosphate or the like. Then, an adhesive layer 20 consisting of an adhesive composition effective for flocking, is applied on the surface of the independent mass member 16 by spraying, dipping or other optional known method. Preferably, the adhesive composition may be an aqueous adhesive composition that includes as a main component an aqueous polyurethane resin including a cross-linking agent selected from the group consisting of ethylene vinyl acetate resin adhesive, elastomer, oxazoline pendant emalsion resin, ethylene-immin compound, carbodiimide compound, methylolurea, melamine resin, spontaneous emulsification type epoxy reson, spontaneous emulsification type block isocyanate, or the like, and as a sub-component a ph modifier such as a pigment dispersing aqueous liquid, an antifoaming agent, dimethyl-methanol amine or the like.

Alternatively, a rust proof synthetic resin layer may be formed on the surface of the independent mass member 16, after the above-indicated pretreatment, by applying a rust proof primer containing a given amount of epoxy resin, phenol resin, polyester resin, urethane resin, zinc chromate, strontium chromate or the like on the outer circumferential surface of the independent mass member 16. Subsequently, the adhesive layer 20 is formed by applying on the rust proof synthetic resin layer a reactive acryl adhesive, e.g., a styrene-butylene synthetic rubber adhesive, according to a suitable known method.

The flock coating 18 is then provided on the thus prepared outer circumferential surface of the independent mass member 16, according to a variety of know flocking methods, e.g., an electrostatic flocking method as described below by way of example. Initially, the independent mass member 16 including the adhesive layer 20 formed on its outer circumferential surface is electrostatically or negatively charged. On the other hand, a multiplicity of piles 22 are positively charged, and then delivered to the surface of the independent mass member 16 on the basis of an electrostatic induction. These piles 22 come and stick into the adhesive layer 20 formed on the surface of the independent mass member 16. In order to cause these piles 22 to firmly adherer to the circumferential surface of the independent mass member 16, the independent mass member 16 covered with the piles 22 is subjected to a drying treatment conducted at a given temperature and a given period of time. Thus, the flock coating 18 is provided on the surface of the independent mass member 16. Preferably, the piles 22 are arranged to protrude from the surface of the independent mass member 16 by a radial length or height within a range of 0.1–1.0 mm.

Each of the pile 22 used for forming the flock coating 18 may be formed of a synthetic resin material such as nylon, polyester, acrylic, rayon, or the like, and preferably has a thickness of 0.3–3.0 denier and a length of 0.1–3.0 mm. The each pile 22 may have a variety of shapes including a straight shape, a curl shape, a bent shape, a rolled shape and other known shapes. These material, thickness, length and shape of the each pile 22 may be suitably determined taking into account required vibration damping characteristics or operating condition of the vibration damping device 10. When the vibration-damping device 10 is operated under the high humidity environment, for example, the polyester may be preferably used as a material of the piles 22, due to its waterproof ability. In order to reduce the manufacturing cost of the vibration-damping device 10, the nylon may be preferably used as a material of the piles 22. In addition, the piles 22 used for forming the flock coating 18 may be uniformed or alternatively be varied in terms of the thickness, length and shape. Namely, the mixture of a plurality of kinds of piles having different thickness, lengths and shapes may be adoptable in the present invention. It is noted that an amount or a density of the piles 22 per unit area of the surface of the independent mass member 16 provided with the flock coating 18 may be suitably changed by controlling an electric attractive force applied to the piles 22 as a result of the above-indicated electrostatic induction, so that the amount of piles 22 delivered to the surface of the independent mass member 16 is controlled.

The independent mass member 16 constructed as described above is housed in the storage space 14 of the housing 12 without being adhesive to any part of the storage space 14. In this state, a given gap is formed along the entire circumference of the independent mass member 16 between the independent mass member 16 and the inner surfaces of the housing 12, allowing the independent mass member 16 to be independently displaced in relation to the inner surface of the housing 12.

More specifically described, in a static state of the vibration-damping device 10 as shown in FIG. 1, where no vibration is applied to the vibration-damping device 10, the independent mass member 12 is held in contact with a lower wall 24 of the housing 12 due to the gravity applied to the independent mass member 16, while being spaced apart from an lower surface of an upper wall 28 of the housing 12 by a given gap 2δ. In addition, the independent mass member 16 is opposed to left-side and right side walls 26a, 26b of the housing 12 with a given gap δ interposed therebetween. Likewise, the independent mass member 16 is interposed between front-side and rear side walls (not shown) of the housing 12, which are opposed to each other in a direction perpendicular to a plane of the drawing sheet of FIG. 1, with the given gap 2δ in total. The size or distance of the gap δ between the inner surface of the left-side or right side wall 26a, 26b of the housing 12 and the surface of the independent mass member 16 in contact with the inner surface of the left-side or right side wall 26a, 26b is preferably set to 0.05–0.8 mm, and more preferably 0.05–0.5 mm. Accordingly the side or distance of the gap 2δ is preferably set to 0.1–1.6 mm, more preferably 0.1–1.0 mm.

When the independent mass member 16 is placed in a central portion of the storage space 14, the given gap δ is formed between the outer circumferential surface of the independent mass member 16 and the inner surfaces of the all walls 24, 28, 26a, 26b of the housing 12. Therefore, the independent mass member 16 is reciprocatory displaceable in a vertical direction between the upper an lower walls 28, 24 by the distance of 2δ, i.e., 0.1–1.6 mm, more preferably 0.1–1.0 mm, and in two orthogonal horizontal directions between the left-side and right-side walls 26b, 26a, and between the front and rear walls (not shown) by the distance of 2δ, i.e., 0.1–1.6 mm, more preferably 0.1–1.0 mm.

The vibration damping device 10 constructed as described above is mounted on the vibrative member with the housing 12 firmly fixed to the vibrative member by means of bolt, adhesives, welding, or other suitable fastening members. In this condition, vibrations excited in the vibrative member are primary applied to the vibration damping device 10 in a vibration input direction. Upon application of the vibrational load to the vibration damping device 10 in the vibration input direction, the independent mass member 16 housed in the storage space 14 comes into impact on (abutting contact with) and rebound from the housing 12 repeatedly, resulting in a bouncing or reciprocating displacement of the independent mass member 16 relative to and independent from the housing 12 in the vibration input direction. Thus, the vibration-damping device 10 of the present embodiment is capable of exhibiting an excellent vibration damping effect with respect to the vibrative member as a result of the impact or abutting contact of the independent mass member 16 on or with the housing 12. In this respect, when the vibration input direction is aligned with the vertical direction as seen in FIG. 1, by way of example, the left and right side walls 26a, 26b or front and rear side walls that are opposed to each other in a direction perpendicular to the vibration input direction, serve as guide members. For stabilizing the bouncing or reciprocating displacement of the independent mass member in the vibration input direction (e.g., in the vertical direction) the gap δ formed between the outer circumferential surface of the independent mass member 16 and the left and right or front and rear walls mutually opposed in the directions perpendicular to the vibration input direction is desirably made small, e.g., 0.8 mm or smaller. Further, this gap δ is desirably set to 0.1 mm or more so as to prevent undesirable interruption of the displacement of the independent mass member by the left, right, front and rear walls serving as guide members.

In the vibration damping device 10 constructed as described above, the independent mass member 16 is provided at its abutting surface with the flock coating 18 and comes into impact on (abutting contact with) the housing 12 at its abutting surface provided with the flock coating 18. This arrangement allows the independent mass member 10 to exhibit an improved vibration damping characteristics in comparison with the conventional vibration damping device in which the abutting surface is composed of the elastic body, elastomer or the like. Moreover, the adoption of the independent mass member having the abutting surface covered with the flock coating 18 allows the vibration damping device 10 to exhibit an excellent vibration damping effect on the basis of the impact of the independent mass member 16 on the housing 12, with respect to low frequency vibrations in an effective manner, without needing an increase in weight of the independent mass member 16. The reasons for the significant improve of the damping characteristics of the vibration damping device 10 as a result of the adoption of the independent mass member 16 having the abutting surface covered with the flock coating 18, may be considered that it is result from a non-linear raise or increase of the spring constant generated between the abutting surfaces of the independent mass member 16 and the housing 12 upon impact of the independent mass member 16 on the housing 12.

In addition, the presence of the flock coating 18 formed on the abutting surface of the independent mass member 16 enables the independent mass member 16 to come to impact on the housing 12 with an amplitude magnification of not smaller than 1 with respect to the housing 12, when the low frequency vibrations are applied to the vibration damping device 10. As a result, the independent mass member 16 comes into impact on (abutting contact with) and rebound from the housing 12 in an effective manner, making it possible to generate a bouncing displacement of the independent mass ember 16 in relation to the housing 12, when the vibration to be damped excited in the vibrative member has an acceleration of not greater than 1G (gravitational acceleration), for example. Thus, the vibration-damping device 10 is capable of effectively exhibiting a high vibration damping effect as a result of the impact (abutting contact) of the independent mass member 16 on the housing 12, with respect to vibrations having a relatively small energy, like vibrations excited in the automotive vehicle.

Since the provision of the flock coating 18 formed on the abutting surface of the independent mass member 16 remarkably ensures the non-linear raise of the spring constant generated between the abutting surfaces of the independent mass member 16 and the housing 12 upon impact of the independent mass member 16 on the housing 12, the vibration damping device 10 does not need the independent mass member to completely rebound from or move away from the housing 12, for exhibiting a desired vibration damping effect that is the same as a vibration damping effect provided with the help of the complete bouncing displacement of the independent mass member 16 in which the independent mass member 16 rebounds from the housing 12 with a spacing therebetween. Namely, the vibration damping device 10 is capable of exhibiting the desired vibration damping effect with the help of a so-called "incomplete bouncing displacement" of the independent mass member 16 relative to the housing 12 in which the independent mass member 16 is rebound from the housing 12 in a manner such that the independent mass member 16 is held in contact with the housing 12 without applying its weight or load on the housing 12.

In the vibration damping device 10, the independent mass member 16 is formed of a high gravity metallic material such as iron, and is covered with the flock coating 18, enabling the independent mass member 16 to ensure the non-linear raise of the spring constant at the abutting surface thereof in contact with the abutting surface of the housing 12, while assuring a rigidity thereof effectively, thereby assuring a further improved vibration damping characteristics of the vibration damping device 10.

Moreover, the spherical configuration of the independent mass member 16 facilitates rounding of the independent mass member 16 upon the bouncing displacement thereof, permitting the independent mass member 16 to come into abutting contact with the housing 12 at a variety of portions of the abutting surface thereof, thus making it possible to prevent a local abrasion or deterioration of the flock coating 18 and an eventual change of the vibration characteristics of the vibration-damping device. The spherical configuration of the independent mass member 16 also makes it possible to reduce an area of the abutting portion of the independent mass member 16 when the independent mass member 16 comes into impact on or abutting contact with the housing 12, thus lowering resistance to the displacement of the independent mass member 12, and effectively exciting the bouncing displacement of the independent mass member 16 relative to the housing 12 upon application of vibration to the vibration-damping device. Thus, the vibration-damping device 10 can effectively exhibit an excellent vibration damping effect on the basis of the abutting contact of the independent mass member 16 with the housing 12. The spherical configuration of the independent mass member 16 is also effective to make abutting conditions of the independent mass member 16 with respect to the housing 12 constant or stabilize, if the vibration damping device 10 is inclined to the vibrative member, in comparison with the case where the abutting surface of the independent mass member 16 has a planer shape.

Figure 3:
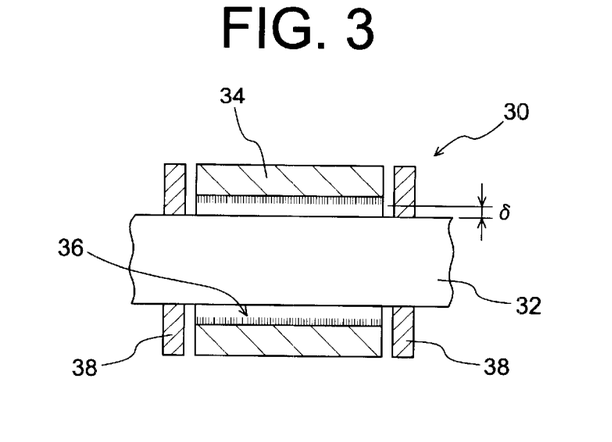
FIG. 3 is an elevational view in axial cross section of a vibration-damping device constructed according to a second embodiment of the invention.

Referring next to FIG. 3, there is depicted a vibration damping device 30 constructed according to a second embodiment of the invention. The vibration damping device 30 includes an abutting member in the form of a longitudinal rod 32 and an independent mass member 34 having a thick-walled cylindrical configuration that is disposed radially outwardly of the rod 32.

Described more specifically, the rod 32 is a circular rod member extending straightly in its axial direction with a circular cross sectional shape that is substantially constant over its axial length, and is formed of a rigid material having a modulus of elasticity of not smaller than $5 \times 10^3$ MPa, such as a synthetic resin and an aluminum alloy. The rod 32 may be constituted by the vibrative member itself, or alternatively a circular rod member formed independently of the vibrative member and firmly fixed to the vibrative member by welding or by bolt. While the rod 32 is composed of the solid circular rod in the present embodiment, the rod 32 may be composed of a hollow cylindrical rod member.

On the other hand, the independent mass member 34 is a thick-walled cylindrical member made of a high gravity metallic material such as iron that has a modulus of elasticity of not smaller than $5 \times 10^3$ MPa. The inner diameter of the independent mass member 34 is made larger than the outer diameter of the rod 32 by a given dimension. The inner circumferential surface of the independent mass member 34, which serves as the abutting surface, is covered with a flock coating 36 formed thereon according to a desired known flocking manner, like in the first embodiment. Preferably, the flock coating 36 has a thickness within a range of 0.1–1.0 mm.

The rod 32 and the independent mass member 34 constructed as described above are assembled together with the independent mass member 34 disposed radially outward of the independent mass member 34, so that the independent mass member 34 is supported by the rod 32 extending therethrough. Since the inner diameter of the independent mass member 34 is made larger than the outer diameter of the rod 32 by a given radial distance, the independent mass member 34 thus assembled with the rod 32 is slightly displaceable relative to the rod 32 in a radial direction perpendicular to the axial direction of the rod 32, while being independent from the rod 32.

An annular stop members 38, 38 made of metal are disposed radially outwardly on the outer circumferential surface of the rod 32 at respective axial positions by pressing, welding or other desirable methods, such that the stop members 38, 38 are opposed to each other in the axial direction with an axial spacing therebetween that is made larger by a given axial distance than the axial length of the independent mass member 34 interposed therebetween. The annular stop members 38, 38 has an outer diameter that is made larger than the inner diameter of the independent mass member 34. In operation, the independent mass member 34 comes into abutting contact with the stop members 38, 38 on axially opposite sides thereof, so as to prevent an excessively large axial displacement of the independent mass member 34 relative to the rod 32, while permitting a radial displacement of the independent mass member 34 relative to the rod 32. In order to eliminate or reduce an impact noise generated upon impact of the independent mass member 34 against the stop members 38, 38, axially opposite end faces of the independent mass member 34 and/or abutting surfaces of the stop members 38, 38 are coated with a rubber buffer, preferably.

As shown in FIG. 3, when the rod 32 and the independent mass member 34 are placed in a substantially coaxial or concentric relation with each other, the outer circumferential surface of the rod 32 and the inner circumferential surface of the independent mass member 34 are opposed to each other with a substantially constant radial gap δ therebetween along the entire inner and outer circumferential surfaces thereof. In the present embodiment, the size or distance of the gap δ is arranged like in the first embodiment. FIG. 3 depicts a state of the vibration-damping device 30 in which the rod 32 and the independent mass member 34 are disposed in the coaxial relation with each other in an attempt to make it easy to understand the invention. In a static state of the vibration damping device 30 in which no vibrational load is applied thereto, on the other hand, the independent mass member 34 is displaced downwardly by a distance δ in the vertical direction as seen in FIG. 3, to thereby be held in contact with the rod 32, due to the gravity acting thereon.

In the vibration damping device 30 constructed according to the present embodiment, when the rod 32 is subjected to vibrations excited in radial directions thereof, the independent mass member 34 disposed radially outwardly of the rod 32 comes into impact on (abutting contact with) and rebounds from the rod 32, and is eventually displaced and bounced in the radial direction relative to the rod 32 repeatedly. Thus, the vibration-damping device 30 is capable of exhibiting an excellent vibration damping effect with respect to the rod 32 as a result of the impact of the independent mass member 30 on the rod 32.

Since the inner circumferential surface of the in dependent mass member 34 serving as the abutting surface in contact with the rod 32, is provided with the flock coating 36 formed thereon, the rod 32 and the independent mass member 34 come into impact on each other, while exhibiting the non-linear raise of the spring constant generated between the abutting surfaces of the rod 32 and the independent mass member 34. With the help of this non-linear raise of the spring constant, the vibration-damping device 30 can exhibit an excellent vibration damping effect, especially to vibrations having a small energy, like the vibration damping device 10 of the first embodiment.

While the present invention has been described in detail with the presently preferred embodiments for the illustrative purpose only, it is to be understood that the invention is not limited to the details of the illustrated embodiments, but may be otherwise embodied.

For instance, while the vibration damping device 10 constructed according to the aforementioned first embodiment adopts the independent mass member 16 having a spherical configuration, the independent mass member 16 may have a circular rod shape. In this case, the independent mass member can be effectively manufactured with ease and with a sufficiently large mass.

Figure 4:
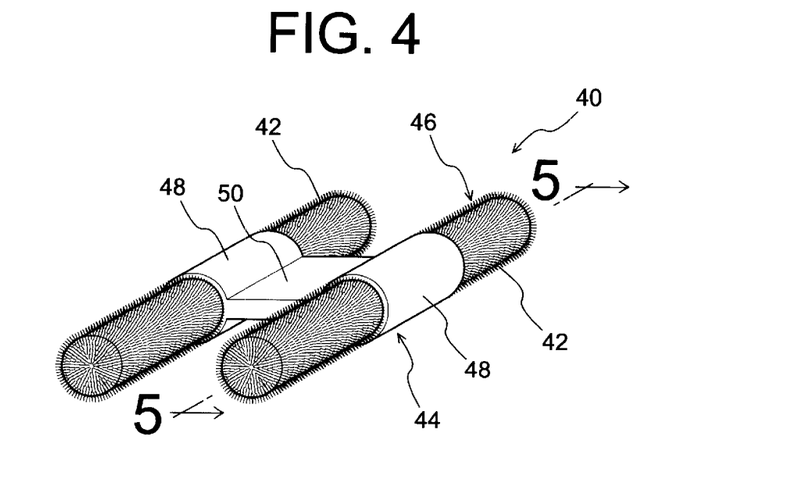
FIG. 4 is a perspective view of one example of an independent mass member adoptable in a vibration-damping device of the invention.
Figure 5:
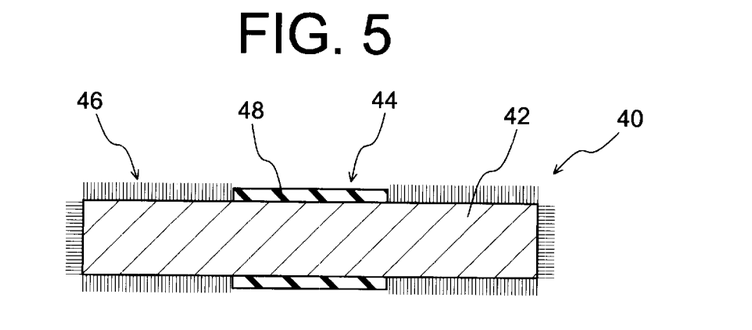
FIG. 5 is a cross sectional view taken along line 5—5 of FIG. 4.

One example of the independent mass member adoptable in the present invention, i.e., an independent mass member 40 is depicted in FIGS. 4 and 5. The independent mass member 40 includes two metallic masses 42, 42 and a connecting rubber elastic body 44 for elastically connecting the metallic masses 42, 42 together.

Described in detail, each of the two metallic masses 42, 42 is a circular rod member extending straightly in its axial direction with a circular cross sectional shape that is substantially constant over its axial length, and is formed with a rigid material having a modulus of elasticity of not smaller than $5 \times 10^3$ MPa, such as iron. The each rod 32 is partially provided with a flock coating 46 formed on a part of the outer circumferential surface of the metallic mass according to the desired know flocking manner like the first embodiment. While the two metallic masses 42, 42 are identical with each other in this example; these metallic masses 42, 42 may be formed differently from each other. Further, the metallic masses 42, 42 may have a variety of shapes including a hollow cylindrical shape, other than the illustrated solid cylindrical shape. These two metallic masses 42, 42 are disposed in a parallel relation with each other with a spacing therebetween, and connected with each other at their axially central portions via the connecting rubber elastic body 44.

The connecting rubber elastic body 44 includes a pair of annular or cylindrical sleeve portions 48, 48 and a rectangular plate like connecting portion 50 interposed between and bonded to the sleeve portions 48, 48 at its opposite end faces. The axial length of each of the sleeve portions 48, 48 is made sufficiently smaller than that of the corresponding metallic mass 42. The each sleeve portion 48 may be bonded to the corresponding metallic mass 42 in the process of vulcanization of a rubber material for forming the connecting rubber elastic body 44. Alternatively, the connecting rubber elastic body 44 is formed by vulcanizing a rubber material in advance, and then the metallic masses 42, 42 are pressed into the pair of cylindrical sleeve portions 48, 48 of the connecting rubber elastic body 44, respectively, such that the inner circumferential surfaces of the cylindrical sleeve portions 48, 48 are bonded to the axially central portions of the outer circumferential surfaces of the metallic masses 42, 42 via adhesive layers. As a result, the two metallic masses 42, 42 are elastically connected to each other via the connecting rubber elastic body 44.

With the two metallic masses 42, 42 elastically connected with each other via the connecting rubber elastic body 44 as described above, the each flock coating 46 protrudes radially outwardly from the outer circumferential surface of the corresponding metallic mass 42 by a radial distance that is made larger than the thickness of the thickness of the corresponding cylindrical sleeve portion 48. Thus, the independent mass member 40 constructed as described above is arranged to come into impact on or abutting contact with the abutting member at a portion provided with the flock coating 46 initially.

The independent mass member 40 as illustrated above may be adoptable in the present invention, and assures the advantages of the present invention as described above with respect to the first embodiment. Another advantage of the independent mass member 40 is that the vibration damping device using the independent mass member 40 can desirably change its vibration damping characteristics, by changing the axial length of the cylindrical sleeve portions 48, 48, the area of the flock coating 46, the shape or size of the metallic masses 42, 42, the material of the connecting rubber elastic body 44, or the like.

While the independent mass member is formed of the rigid metallic materials such as iron, in the illustrated embodiment, the independent mass member may be formed of a rubber elastic body, synthetic resin material or other elastic materials in its entirety. Alternatively, the independent mass member formed of iron or other rigid metallic materials may be coated by a rubber layer formed on its outer circumferential surface. The flock coating are formed on the outer circumferential surfaces of these independent mass members constructed as described above. This arrangement making it possible to further enhance a degree of freedom in tuning the vibration damping characteristics of the vibration damping device. Likewise, the surface of the abutting portion may be coated by a rubber layer and then covered with the flock coating formed on the surface of the rubber layer.

In the illustrated embodiment, the flock coating is directly formed on the outer surface of the independent mass member via the adhesive layer. The present invention may otherwise be embodied by utilizing a flocked sheet formed independently of the independent mass member. Namely, the flocked sheet separately prepared from the independent mass member is bonded to the surface of the independent mass member by using adhesive.

The illustrated embodiments may further be arranged such that the independent mass member and the abutting portion come into impact on each other via an elastic member that is subjected to a shear deformation upon application of a load in a direction in which the independent mass member and the abutting portion impact on each other. This arrangement allows the vibration-damping device to exhibit a desired damping effect in a further effective manner with respect to low frequency vibrations. This elastic member is formed on at least one of the independent mass member and the abutting member.

The flock coating, which is provided on the abutting surface of the independent mass member in the illustrated embodiment, may be provided on the abutting surface of the abutting member instead of the abutting surface of the independent mass member, or alternatively may be provided on both of the abutting surfaces of the abutting member and the independent mass member.

In the illustrated embodiment, the vibration damping device of the invention is used in the vehicle for reducing vibrations excited in the vibrative member of the vehicle. The vibration-damping device of the invention is applicable to various kinds of devices for reducing vibrations of vibrative members thereof, likewise.

It is also to be understood that the present invention may be embodied with various other changes, modifications and improvements, which may occur to those skilled in the art, without departing from the spirit and scope of the invention defined in the following claims.

EXAMPLES

To further clarify the present invention, there will be described in detail some examples of the present invention.

It is to be understood that the present invention is by no means limited to the details of these examples, but may be embodied with various changes modifications and improvements which may occur to those skilled in the art, without departing the scope of the invention.

Figure 6:
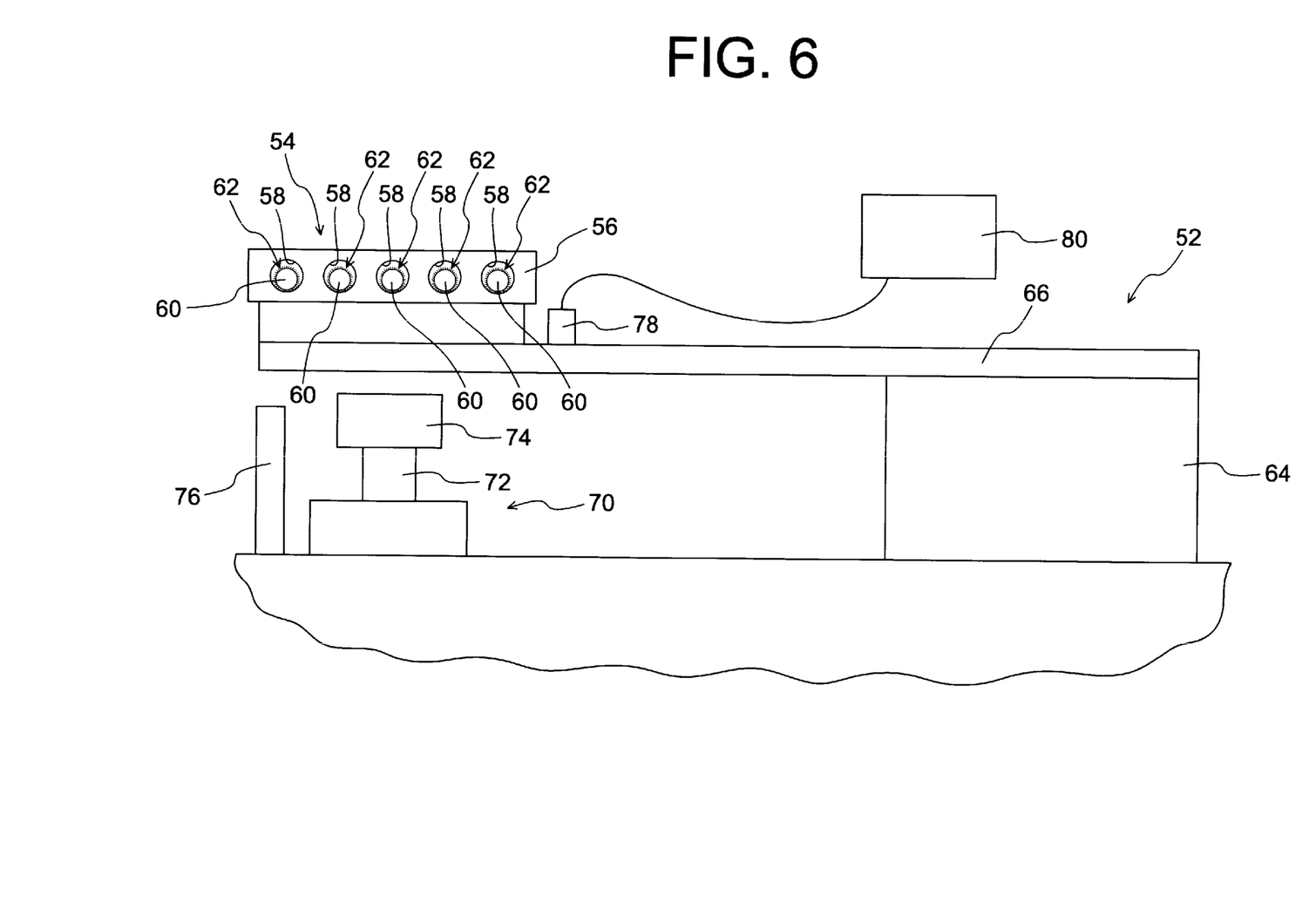
FIG. 6 is a schematic view of vibration characteristic measuring apparatus to which a vibration-damping device constructed according to Example 1 of the invention is attached to be measured.

Initially, a vibration damping device 54 according to Example 1 of the present invention was prepared, as shown in FIG. 6. The vibration-damping device 54 includes a housing 56 having a plurality of storage space 58 and a plurality of independent mass members 60 housed in the plurality of storage space 58, respectively.

More specifically described, the housing 56 is a rectangular block-like member made of metal having a modulus of elasticity of not smaller than $5 \times 10^3$ MPa, and has five storage spaces 58 each extending therethrough straightly by a given axial length with a generally constant circular shape in cross section. Each of the independent mass members 60 is a solid circular rod made of steel whose profile is made similar to and smaller than that of the inner circumferential surface of the corresponding storage space 58. A flock coating 62 is formed on the outer circumferential surface of the each independent mass member 60, so as to protrude radially outwardly from the outer circumferential surface of the independent mass member 60 by about 0.2 mm. The flock coating 62 consists of a multiplicity of piles 62 each being made of nylon and having a thickness of 0.8 denier and a length of 0.2 mm. The thus constructed independent mass members 60 are housed in the storage spaces 58, respectively.

The vibration-damping device 54 constructed according to Example 1 was mounted on a vibration characteristic measuring apparatus 54 as shown in FIG. 6, and then actual vibration damping characteristics of the vibration-damping device 54 were measured on the cases where a ratio of the combined mass of the independent mass members 60 to the mass of the vibration damping device 54 varied by changing the number of the independent mass members 60 housed in the vibration damping device 54 from one through five.

Described in detail, the vibration-characteristic measuring apparatus 52 includes a base 64 and an oscillation bar 66 fixed to the base at one of opposite ends thereof so that the other end thereof serves as a free end. The vibration-damping device 54 is mounted on the free end of the oscillation bar 66. The vibration characteristic measuring apparatus 52 further includes a pneumatic piston-cylinder device 70 equipped with an electromagnet 74, which is disposed below the free end of the oscillation bar 66 with a given vertical spacing therebetween as seen in FIG. 6. The free end of the oscillation bar 66 was attracted by and fixed to the electromagnet 74 upon energizing a coil of the electromagnet 74. With the free end of the oscillation bar 66 fixed to the electromagnet 74, the pneumatic piston-cylinder device 70 was operated to retract a piston rod 72 thereof until the free end of the oscillation bar 66 abutted on a stopper plate 76, so as to elastically deform the free end of the oscillation bar 66 in the vertically downward direction by a given amount.

Subsequently, the coil of the electromagnet 74 was not energized for releasing the elastic deformation of the oscillating bar 66, thereby permitting a free oscillation of the oscillation bar 66. A vibration acceleration of the oscillation bar 66 during its free oscillation was measured by a output signal processing device 80 on the basis of output values of an acceleration sensor 78 attached to the oscillation bar 66 with respect to five cases where the number of independent mass member varied from one to five.

Figure 7:
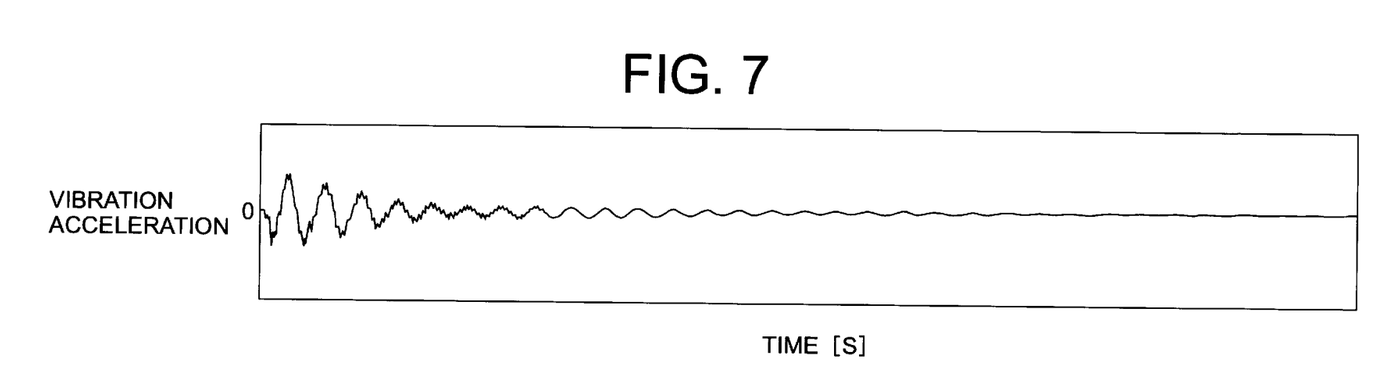
FIG. 7 is a graph showing a time variation of a measured vibration acceleration regarding the vibration-damping device of Example 1 that houses three flocked independent mass member therein.
Figure 8:
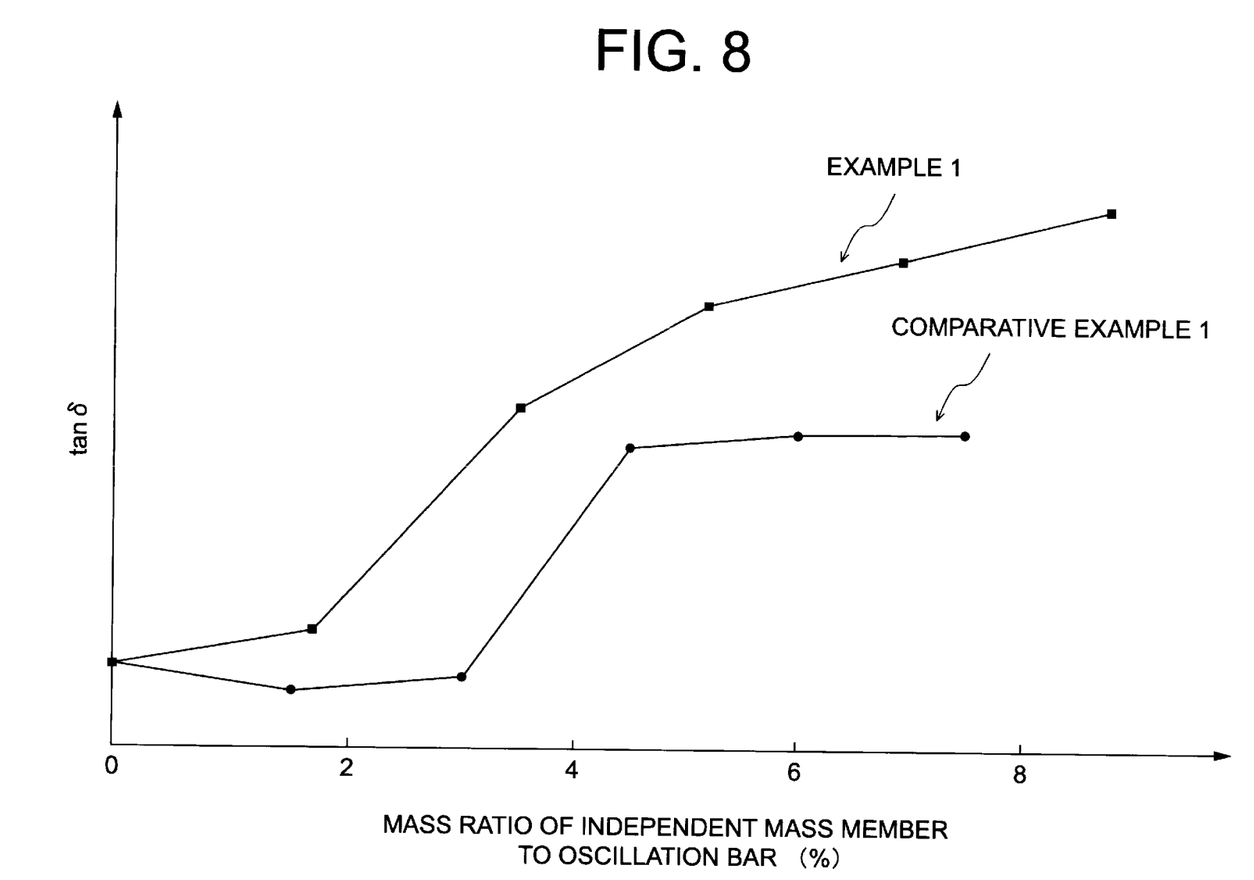
FIG. 8 is a graph showing a relationship between a ratio of a mass of the independent mass member to a mass of the vibrative member and a loss tangent (tan δ) with respect to the vibration-damping device of Example 1 of FIG. 6, together with the same with respect to Comparative example 1.
Figure 9:
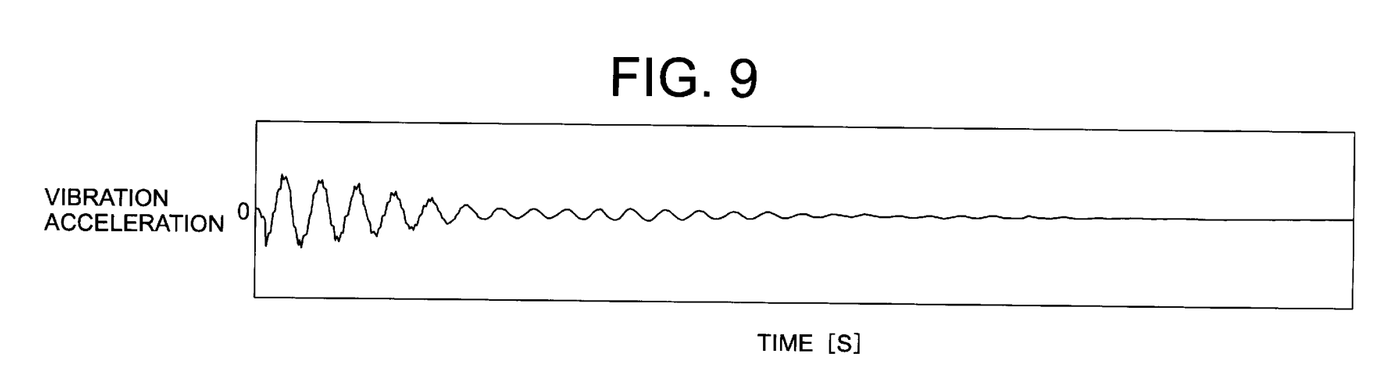
FIG. 9 is a graph showing a time variation of a measured frequency acceleration regarding a vibration-damping device of Comparative example 1 that houses four independent mass members whose outer circumferential surfaces are coated with a covering rubber layers.

FIG. 7 shows the result of measuring of the vibration acceleration of the oscillating bar 66 when the vibration damping device 54 includes three independent mass members 60 so that the ratio of the combined mass of the three independent mass members 60 to the mass of the oscillation bar 66 is set to 5.2%, by way of example. FIG. 8 shows five values of loss factor calculated from the five measurements of the vibration acceleration of the oscillating bar 66 on the every cases where the number of housed independent mass members were changed from one through five. On the other hand, a vibration-damping device according to Comparative Example 1 was prepared, that is different from the vibration-damping device 54 according to Example 1 only in the structure of the independent mass member. Namely, the independent mass member of the vibration-damping device according to Comparative Example 1 has an outer circumferential surface coved with a rubber elastic layer made of a NR-SBR rubber material and having a thickness of 1.0 mm, rather than flock coating. Like the Example 1, the actual vibration damping characteristics of the vibration-damping device according to Comparative Example 1 were measured on the cases where a ratio of the combined mass of the independent mass members to the mass of the oscillation bar 66 varied by changing the number of the independent mass members housed in the vibration damping device from one through five. FIG. 9 shows the results of measuring of the vibration acceleration of the oscillating bar 66 when the vibration damping device according to Comparative example 1 includes four independent mass members so that the ratio of the combined mass of the four independent mass members to the mass of the oscillation bar 66 is set to 6.0% by way of example. Five values of loss factor calculated from the measurements of the vibration acceleration of the oscillating bar 66 on the every cases where the number of housed independent mass members varied from one through five are shown in FIG. 8 as Comparative example 1.

As is understood from the measurements shown in the graph of FIG. 8, the vibration-damping device 54 according to the Example 1 is capable of exhibiting an extremely high vibration damping effect in comparison with the vibration-damping device of the Comparative Example 1 in which the independent mass members provided with no flock coating is adopted, even if these vibration damping devices have the same ratio of the mass of the independent mass members to the mass of the oscillation bar 66. As is understood from the measurements shown in the graphs of FIGS. 7 and 9, the vibration damping device 54 according to Example 1 is capable of exhibiting a higher vibration damping effect in comparison with the vibration damping device of the Comparative example 1, even if the ratio of the mass of the independent mass member to the mass of the oscillation bar 60 is made smaller than that of the vibration damping device of the Comparative example 1. This means that the adoption of the flock coating provided on the abutting surface of the independent mass member allows the vibration-damping device to use light-weighted independent mass member while assuring a desired vibration damping characteristics thereof.

Figure 10:
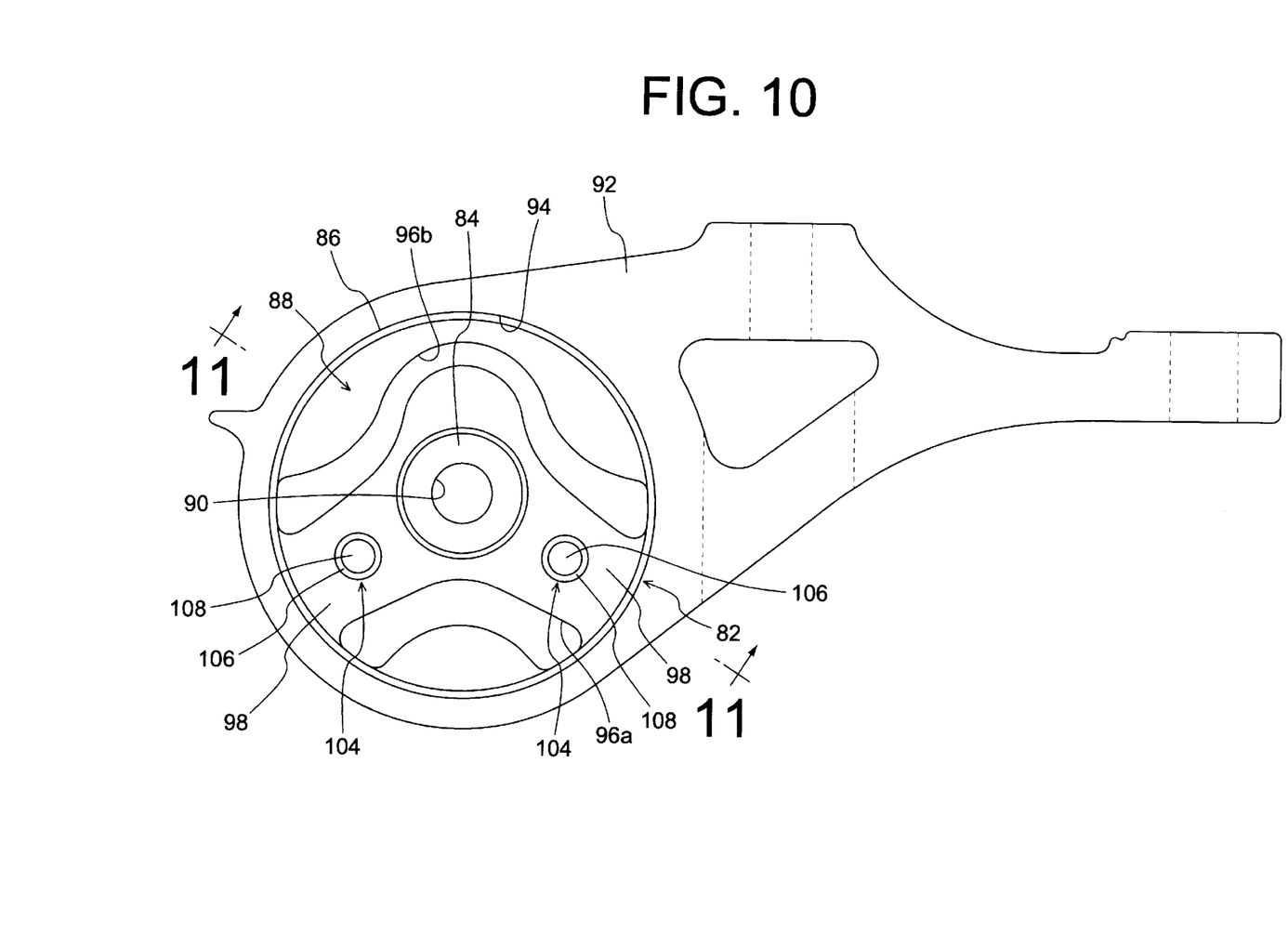
FIG. 10 is a front elevational view of a vibration-damping constructed according to Example 2 of the invention.
Figure 11:
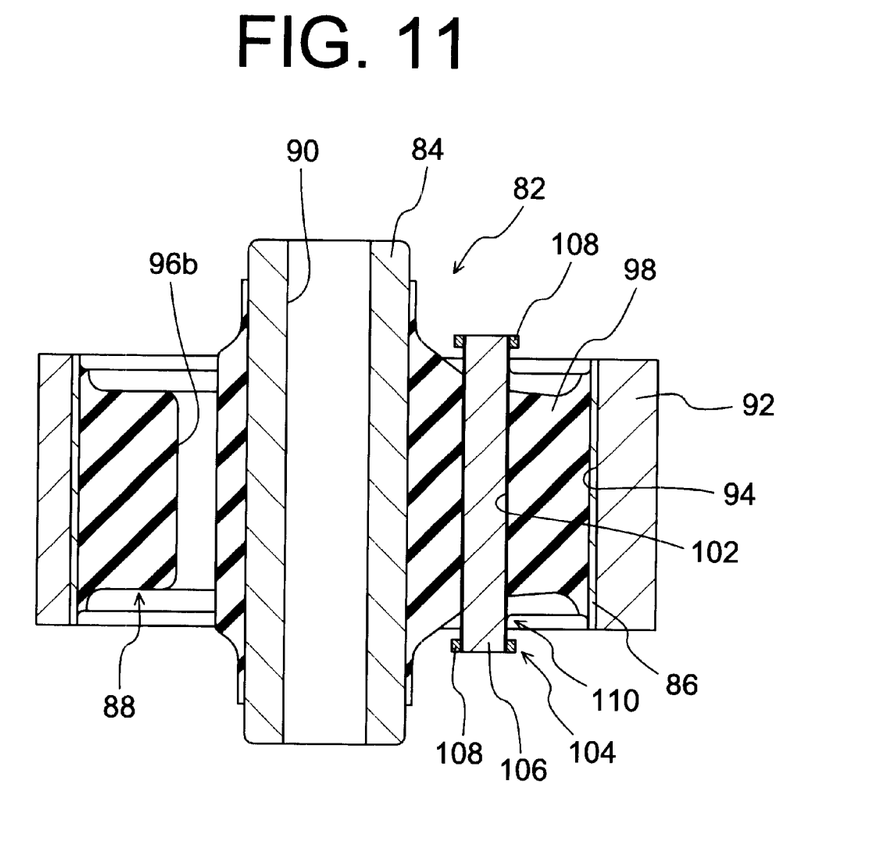
FIG. 11 is a cross sectional view taken along line 11—11 of FIG. 10.

Referring next to FIGS. 10, 11, a vibration-damping device 82 constructed according to Example 2 of the present invention was prepared. The vibration damping device 82 includes an inner sleeve 84 and an outer sleeve 86 disposed radially outwardly of the inner sleeve 84, which are elastically connected with each other by an elastic body 88 made of rubber interposed therebetween. The inner and outer sleeves 84, 86 are adapted to be attached to one and the other of a power unit and a body of an automotive vehicle (not shown) for elastically mounting the power unit on the body of the vehicle in a vibration damping fashion.

More specifically described, the inner sleeve 84 is formed of a rigid material having a modulus of elasticity of not smaller than $5 \times 10^3$ MPa, such as an aluminum alloy, and fixed to the power unit by means of a bolt screwed into a bore 90 thereof. The outer sleeve 86 disposed in a concentric relation with the inner sleeve 84 is also formed of the rigid material having a modulus of elasticity of not smaller than $5 \times 10^3$ MPa, such as an aluminum alloy, and is forcedly pressed into a fixing bore 94 formed in a bracket 92 fixed to the body, so that the outer sleeve 86 is fixed to the body of the vehicle via the bracket 92. The elastic body 88 interposed between the inner and outer sleeves 84, 86 has a generally thick-walled cylindrical shape, and bonded at its inner circumferential surface to the outer circumferential surface of the inner sleeve 84 and at its outer circumferential surface to the inner circumferential surface of the outer sleeve 86 in the process of vulcanization of a rubber material for forming the elastic body 88. Thus, the inner and outer sleeve members 84, 86 and the elastic body 88 cooperates to form an integral vulcanized assembly. The elastic body 88 has a pair of voids 96a, 96b formed at respective circumferential positions that are opposed to each other in a diametric direction in which a primary vibrational load is applied to the vibration-damping device 82, i.e., in the vertical direction as seen in FIG. 10. The void 96a extends through the elastic body 88 in an axial direction of the elastic body 88 with a generally arcuate plate-like shape in cross section. The void 96b also extends through the elastic body 88 in the axial direction with a generally semi-circular shape in cross section. In the presence of the voids 96a, 96b, the inner and outer sleeves 84, 86 are substantially elastically connected with each other by a pair of elastic connecting portions 98, 98 of the elastic body 88, which portions cooperate to have an inverted V-letter shape in their cross section.

Each of the pair of the elastic connecting portions 98 is formed at its radially intermediate portion with a through hole 102 extending therethrough in its axial direction with a generally constant circular shape in cross section. Namely, the through hole 102 has a central axis extending parallel to the central axes of the inner and outer sleeve members 84, 86. The inner diameter of the through hole 102 is made sufficiently smaller than the width or circumferential length of the corresponding elastic connecting portion 98. The each through hole 102 houses an independent mass 104.

The each independent mass member 104 housed in the corresponding through hole 102 has a mass of 21 g in its entirety and includes a mass body 106 in the form of a cylindrical circular rod, which is made of steel and extends straightly in an axial direction with a generally constant circular shape in cross section. The mass body 106 has an axial length that is made larger than that of the corresponding through hole 102 so that the axially opposite end portions of the mass body 106 protrudes axially outwardly from axially opposite opening of the through hole 102. A pair of annular stop members 108, 108 made of metal are firmly fitted onto the axially opposite end portions of the mass body 106 by pressing for example. Since the stop members 108, 108 have an outer diameter that is made larger than the inner diameter of the corresponding through hole 102, the stop members 108, 108 come into abutting contact with the axially opposite end faces of the corresponding elastic connecting portion 98, respectively, to thereby prevent disengagement of the each independent mass member 104 from the corresponding through hole 102. The each independent mass member 104 further includes a flock coating 110 formed on the outer circumferential surface of the mass body 106 via an adhesive layer so as to protrude radially outwardly from the outer circumferential surface of the mass body 106 by about 0.2 mm. The flock coating 110 comprises a multiplicity of piles each being made of nylon and having a thickness of 0.8 denier and a length of about 0.2 mm.

The independent mass members 104, 104 are housed in the through holes 102, 102 formed through the pair of elastic connecting portions 98, respectively, as described above. With the each independent mass member 104 is located in a co-axial or concentric relation with the corresponding through hole 102, a given gap is formed along the entire circumference of the independent mass member 104 between the independent mass member 104 and the inner surfaces of the through hole 102, allowing the independent mass member 104 to be independently displaced in relation to the inner surface of the through hole 102 in all radial directions perpendicular to the central axis of the through hole 102. A suitable gap is formed between the each of the stop members 108 and the corresponding end face of the elastic connection portion 98 so that the stop member 108 does not interfere with the displacement of the independent mass member 104 relative to the through hole 104.

Figure 12:
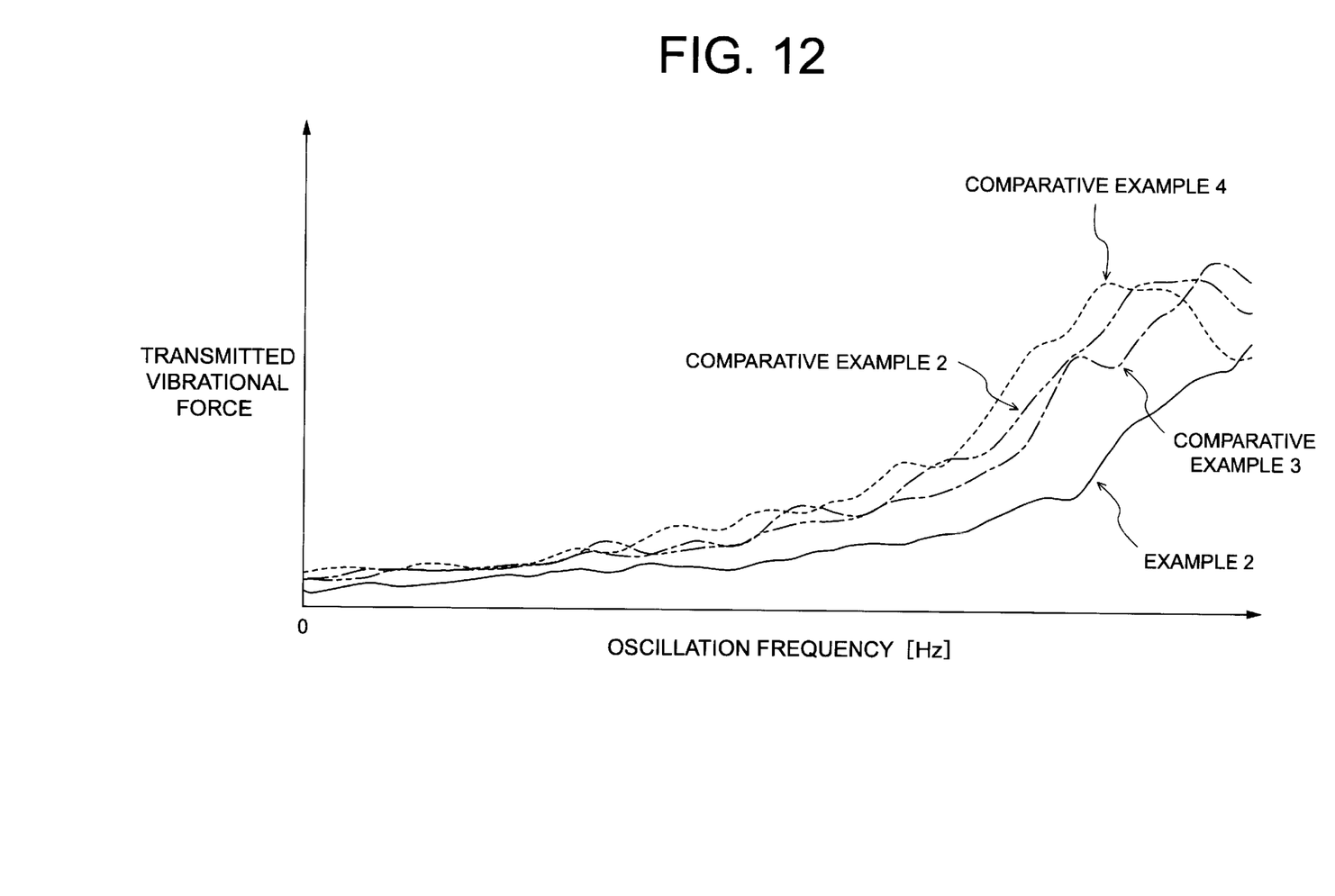
FIG. 12 is a graph showing measured frequency characteristics of transmitted vibrational forces of the vibration-damping device of Example 2 and Comparative examples 2–4.

The thus prepared vibration damping device 82 according to Example 2 were measured in its vibration damping characteristics as follows. FIG. 12 shows the results of applying an oscillating force (i.e., vibration) having an acceleration of 10.0 m/ss to the inner sleeve 84 under a state where no initial load is applied to the inner sleeve 84 and measuring a vibrational force transmitted from the inner sleeve 84 to the outer sleeve 86. On the other hand, vibration damping devices according to Comparative Examples 2 and 3 were prepared. In Comparative example 2, the independent mass members each being covered with a rubber elastic layer made of a NR-SBR rubber material and having a mass of 16 g were housed in the through holes 102, respectively, instead of the independent mass members 104 each being covered with the flock coating 110. In comparative example 3, the independent mass members each being covered with the rubber elastic layer made of the NR-SBR rubber material and having a mass of 69 g were housed in the through holes 102, respectively, instead of the independent mass members 104. FIG. 12 also shows the results of Comparative examples 2 and 3 in which the same measurement tests were performed on the vibration damping devices according to Comparative examples 2 and 3. Further, a vibration damping device devoid of independent mass members were prepared as a Comparative example 4, and the results of the same measurement tests performed on the vibration damping device of the Comparative example 4 are also shown in the graph of FIG. 12.

As is understood from the measurements shown in the graph of FIG. 12, the vibration damping device 82 according to the Example 2 that houses the independent mass members 104 each being covered with the flock coating 110 formed thereon is capable of preventing or minimizing deterioration of its vibration damping characteristics due to a surging of the elastic connecting portions 98, 98 of the elastic body 88 at a specific frequency range in an effective manner, in comparison with the vibration damping devices according to the Comparative examples 2 and 3, which houses the independent mass members covered with the rubber layer instead of the flock coating 110, and the vibration damping device according to the Comparative example 4, which houses no independent mass member. Therefore, it is noted that the vibration-damping device 82 according to the Example 2 is capable of exhibiting an excellent vibration damping effect on the basis of the elastic characteristics of the elastic body 88 with respect to vibrations over a wide frequency range with high stability. It is also noted that the vibration-damping device 82 according to Example 2 can exhibit an excellent vibration damping effect in comparison with the vibration damping device according to Comparative example 3, although the mass of the each independent mass member 104 in vibration damping device 82 is made sufficiently smaller than that of the independent mass members in the Comparative example 3. This shows that the adoption of the independent mass member whose abutting surface is covered with the flock coating permits the use of a light-weighted independent mass member or members for assuring a desired vibration damping effect on the basis of the impact or abutting contact of the independent mass member on or with the abutting members in the vibration damping device of the present invention.

What is claimed is:

1. A vibration-damping device for damping vibrations of a vibrative member, comprising:
   an abutting member adapted to be fixedly disposed in the vibrative member and having an abutting surface; and
   an independent mass member disposed in relation to said abutting member such that said independent mass member is independently displaceable relative to said abutting member without being adhesive to said abutting member, said independent mass member having an abutting surface that comes into abutting contact directly and elastically with said abutting surface of said abutting member,
   wherein at least one of said abutting surfaces of said abutting member and said independent mass member is provided with a flock coating.

2. A vibration-damping device according to claim 1, wherein said abutting member comprises a hollow housing member adapted to be fixedly disposed in the vibrative member and including a storage space in which said independent mass member is housed.

3. A vibration-damping device according to claim 1, wherein said abutting member comprises a longitudinal rod shaped member adapted to be fixedly disposed in the vibrative member, while said independent mass member comprises an annular or cylindrical member disposed radially outwardly of said rod shaped member.

4. A vibration-damping device according to claim 1, wherein said at least one abutting surfaces provided with said flock coating comprises a metallic base.

5. A vibration-damping device according to claim 1, wherein said independent mass member has an outer circumferential surface serving as said abutting surface thereof and having a spherical or cylindrical shape with a circular cross section, and said flock coating is provided on said outer circumferential surface of said independent mass member.

6. A vibration-damping device according to claim 1, wherein said flock coating provided on said at least one of said abutting surfaces of said abutting member and said independent mass member is formed by using a multiplicity of piles each being made of a synthetic resin material and having a thickness of 0.3–3.0 denier and a length of 0.1–3.0 mm.

7. A vibration-damping device according to claim 1, wherein said at least one of said abutting surfaces of said abutting member and said independent mass member is provided with said flock coating at one part thereof and with a thin-elastic body layer whose thickness is made smaller than said length of said each pile at an other part thereof.

8. A vibration-damping device according to claim 1, wherein said independent mass member has a mass within a range of 5–500 g in a single form thereof.

9. A vibration-damping device according to claim 1, wherein an overall mass of said independent mass member is held within a range of 2–10% of an overall mass of the vibrative member.

10. A vibration-damping device according to claim 1, wherein said abutting member includes two of said abutting surfaces which are opposed to each other in a vibration input direction with the independent mass member interposed therebetween such that said independent mass member is reciprocatory displaceable between said two abutting surfaces by a distance within a range of 0.1–1.6 mm so that said independent mass member comes into abutting contact with said two abutting surfaces of said abutting member located on opposite sides of said independent mass member in said vibration input direction.

11. A vibration-damping device according to claim 1, wherein said abutting member includes a pair of guide members that are opposed to each other with said independent mass member interposed therebetween in a direction perpendicular to a vibration input direction in which said independent mass member is independently displaceable in relation to said abutting member, such that said independent mass member is reciprocatory displaceable between said two abutting surfaces by a distance within a range of 0.1–1.6 mm so that said independent mass member comes into abutting contact with said pair of guide members so as to restrict displacement thereof in said direction perpendicular to said vibration input direction.

12. A vibration-damping device according to claim 1, wherein said abutting surfaces of said abutting member and said independent mass member are formed of a rigid material having a modulus of elasticity of not smaller than $5\times10^3$ MPa, and said at least one of said abutting surfaces is provided with said flock coating.

13. A vibration-damping device according to claim 1, wherein said flock coating is directly formed on said at least one of said abutting surfaces of said abutting member and said independent mass member via an adhesive layer.

14. A vibration-damping device according to claim 1, wherein said flock coating is formed on a sheet that is formed independently of said at least one of abutting surfaces of said abutting member and said independent mass member, said sheet on which said flock coating is formed being fixed to said at least one of abutting surfaces.

* * * * *